United States Patent
Narayanan et al.

(10) Patent No.: US 10,171,953 B2
(45) Date of Patent: Jan. 1, 2019

(54) VEHICLE EVENT NOTIFICATION VIA CELL BROADCAST

(71) Applicants: AT&T Mobility II LLC, Atlanta, GA (US); AT&T Intellectual Property II, L.P., Atlanta, GA (US)

(72) Inventors: Murali Narayanan, Redmond, WA (US); Thomas Becker, Atlanta, GA (US); Zachery Carter, Cumming, GA (US); Roger Mahler, Marietta, GA (US); George Murphy, Holly Springs, NC (US); Paul Nichols, Cumming, GA (US)

(73) Assignees: AT&T Mobility II LLC, Atlanta, GA (US); AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 15/381,026

(22) Filed: Dec. 15, 2016

(65) Prior Publication Data

US 2018/0176742 A1    Jun. 21, 2018

(51) Int. Cl.
*H04W 4/06* (2009.01)
*H04W 4/04* (2009.01)
(Continued)

(52) U.S. Cl.
CPC ............ *H04W 4/046* (2013.01); *G08G 1/091* (2013.01); *G08G 1/096716* (2013.01);
(Continued)

(58) Field of Classification Search
CPC ....... H04W 4/06; H04W 4/22; H04W 76/007; H04W 72/005; H04W 76/002; H04W 48/10; H04W 4/12; H04W 4/18; H04W 4/02; H04W 68/00; H04W 92/18; H04W 4/08; H04W 36/0007; H04W 76/00; H04W 76/40; H04W 76/50; H04W 4/90; H04W 4/46; H04W 4/04; H04W 4/046;
(Continued)

(56) References Cited

U.S. PATENT DOCUMENTS 8,819,414 B2    8/2014   Bellur et al.
8,904,183 B2   12/2014   Bellur et al.
(Continued)

OTHER PUBLICATIONS

Hsu et al., "Challenges, Approaches, and Solutions in Intelligent Transportation Systems," 2010 Second International Conference on Ubiquitous and Future Networks (ICUFN), Jun. 16-18, 2010, pp. 366-371, IEEE.
(Continued)

*Primary Examiner* — Meless Zewdu
(74) *Attorney, Agent, or Firm* — Hartman & Citrin LLC (57) ABSTRACT

Concepts and technologies disclosed herein are directed to vehicle event notification via cell broadcast. According to one aspect of the concepts and technologies disclosed herein, a system can receive an event message in response to an event. The system can extract information associated with the event from the event message. The system can determine an area of relevance for the event. The system can create an event notification message. The event notification message can be formatted as a cell broadcast message to be broadcast to a cell serving at least a portion of the area of relevance.

20 Claims, 6 Drawing Sheets

(51) Int. Cl.
- *G08G 1/09* (2006.01)
- *G08G 1/16* (2006.01)
- *H04W 4/90* (2018.01)
- *H04W 4/80* (2018.01)
- *G08G 1/0967* (2006.01)
- *G08G 1/00* (2006.01)

(52) U.S. Cl.
CPC . *G08G 1/096725* (2013.01); *G08G 1/096741* (2013.01); *G08G 1/096775* (2013.01); *G08G 1/096783* (2013.01); *G08G 1/096791* (2013.01); *G08G 1/162* (2013.01); *G08G 1/164* (2013.01); *G08G 1/205* (2013.01); *H04W 4/06* (2013.01); *H04W 4/80* (2018.02); *H04W 4/90* (2018.02)

(58) Field of Classification Search
CPC ... H04W 88/18; H04W 88/184; H04W 4/029; H04W 4/021; H04W 4/80; H04M 3/5116; H04N 21/814; B60R 22/32; H04H 20/00; H04H 20/02; H04H 20/04; H04H 20/08; H04H 60/00; H04H 60/02; G08G 1/091; G08G 1/164; G08G 1/162; G08G 1/09; G08G 1/16

See application file for complete search history.

(56) References Cited

U.S. PATENT DOCUMENTS

| | | | |
|---|---|---|---|
| 8,930,041 B1 | 1/2015 | Grimm et al. | |
| 9,021,256 B2 | 4/2015 | Zhang et al. | |
| 9,094,206 B2 | 7/2015 | Di Crescenzo et al. | |
| 9,135,820 B2 | 9/2015 | Ando et al. | |
| 9,461,827 B2 | 10/2016 | Laberteaux et al. | |
| 2005/0002347 A1* | 1/2005 | Lee | G08G 1/0104 370/312 |
| 2005/0237963 A1* | 10/2005 | Storm | H04W 36/0066 370/320 |
| 2007/0167147 A1* | 7/2007 | Krasner | G08B 25/009 455/404.2 |
| 2008/0051971 A1* | 2/2008 | Sung | G08G 1/092 701/117 |
| 2008/0070546 A1* | 3/2008 | Lee | H04W 4/90 455/404.2 |
| 2009/0005019 A1* | 1/2009 | Patel | G08B 27/006 455/414.2 |
| 2010/0019932 A1* | 1/2010 | Goodwin | G08G 1/162 340/902 |
| 2010/0250106 A1* | 9/2010 | Bai | G08G 1/096716 701/117 |
| 2011/0034201 A1* | 2/2011 | Hamada | H04L 67/12 455/517 |
| 2011/0191581 A1 | 8/2011 | Shim et al. | |
| 2011/0306353 A1* | 12/2011 | Kim | H04W 48/18 455/452.2 |
| 2013/0342368 A1* | 12/2013 | Nathanson | G07C 5/008 340/903 |
| 2015/0010212 A1* | 1/2015 | Segarra | G08G 1/09626 382/104 |
| 2015/0092661 A1* | 4/2015 | Huang | H04W 40/026 370/315 |
| 2015/0254978 A1* | 9/2015 | Mawbey | G08G 1/092 340/902 |
| 2015/0318996 A1 | 11/2015 | van Roermund | |
| 2016/0087804 A1 | 3/2016 | Park et al. | |
| 2016/0119151 A1 | 4/2016 | Park et al. | |
| 2016/0140842 A1 | 5/2016 | Park et al. | |
| 2016/0295624 A1 | 10/2016 | Novlan et al. | |
| 2016/0323233 A1* | 11/2016 | Song | G06Q 50/30 |
| 2017/0046216 A1* | 2/2017 | Stenneth | G06F 11/0793 |
| 2017/0094587 A1* | 3/2017 | Ding | H04W 8/22 |
| 2017/0111132 A1* | 4/2017 | Shim | H04H 20/16 |
| 2017/0243485 A1* | 8/2017 | Rubin | G08G 1/096791 |

OTHER PUBLICATIONS

"Leading the world to 5G: Cellular Vehicle-to-Everything (C-V2X) technologies," Qualcomm, Jun. 2016.

* cited by examiner

VEHICLE EVENT NOTIFICATION VIA CELL BROADCAST

BACKGROUND

Today, information regarding traffic accidents, poor or dangerous weather conditions, road hazards, and the like are distributed to drivers and other vehicle occupants via radio traffic reports and other resources. These resources typically require manual initiation through human interaction, such as a vehicle occupant tuning to a particular radio station. The information these resources provide is often outdated (e.g., 10-15 minutes old). For this reason, by the time vehicle occupant(s) receives the information, it is often too late for the vehicle occupant(s) to determine alternatives for their travel.

SUMMARY

Concepts and technologies disclosed herein are directed to vehicle event notification via cell broadcast. It should be understood, however, that that event notifications can be sent to other devices, such as, but not limited to, cell phones, 911 call centers, other systems/services (e.g., ambulance, policy, city/town control/command centers), and the like.

According to one aspect of the concepts and technologies disclosed herein, a system can receive an event message in response to an event. The system can extract information associated with the event from the event message. The system can determine an area of relevance for the event. The system can create an event notification message. The event notification message can be formatted as a cell broadcast message to be broadcast to a cell serving at least a portion of the area of relevance.

In some embodiments, the system can receive the event message from a first vehicle. In these embodiments, the first vehicle can provide, via a designated short-range communications ("DSRC") component, the event message to a second vehicle located within a distance from the first vehicle. Moreover, in these embodiments, the area of relevance can include a third vehicle located outside of a range of the DSRC component. The third vehicle can be served by the cell. In addition to or as an alternative to DSRC, other technologies such as Long-Term Evolution ("LTE") vehicle-to-everything ("V2X"), which is standardized by Third Generation Partnership Project ("3GPP") can be used. Therefore, DSRC and other technologies that facilitate communication to/from a vehicle and another entity are collectively referred to herein as vehicle communications technologies.

In some embodiments, the system can receive the event message from a roadside device. In some embodiments, the system can receive multiple event messages from the vehicle, the roadside device, one or more other vehicles, or some combination thereof. In some embodiments, the system can receive the event message from another entity, such as a 911 call center, a city/town command center, or any other system that needs for any reason to notify a vehicle and/or other device operating in the area of relevance that the event has occurred.

In some embodiments, the event can include a vehicular accident in which the vehicle is involved. The information associated with the event can include accident information. In some other embodiments, the event can include a traffic event, a weather event, or a road hazard event.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to vehicle event notification via cell broadcast. The concepts and technologies disclosed herein are suitable for vehicle-to-everything ("V2X") communications, which can encompass vehicle-to-vehicle ("V2V") communications and vehicle-to-infrastructure ("V2I") communications. Other communications such as vehicle-to-pedestrian ("V2P") and infrastructure-to-vehicle ("I2V") also are contemplated. The concepts and technologies disclosed herein provide smart identification and analysis of events, such as accidents, weather conditions, road construction, road hazards, and the like, and facilitate broadcast of event notification messages to relevant vehicles in the vicinity of the event so that occupants of the vehicle(s) can take appropriate remedial action, such as taking an alternative route to avoid the event. Accordingly, the concepts and technologies disclosed herein can significantly reduce traffic congestion, reduce other events (e.g., accidents) in the vicinity, and can ensure vehicles reach their destinations along the most efficient and safe routes.

In accordance with one aspect of the concepts and technologies disclosed herein, when an event message is generated by a vehicle (e.g., in response to an event such as an accident, airbag deployment, instance of sudden braking, and/or the like) or by a system (e.g., in response to an event related to the weather, a water main break, another infrastructure vulnerability, and/or the like), the event message is sent to a traffic optimization management ("TOM") server. If multiple cars are involved in the event, the TOM server can receive event messages from all the relevant cars. The TOM Server, in response, can analyze the event messages and can create an event notification message with a specification of an area of relevance, broadcast duration, broadcast interval, location of the event, and a description of the event, and can send all of this information to a cell broadcast center ("CBC"). The CBC uses the broadcast duration to know how long the event notification messages will be broadcasted. If the broadcast duration is 30 minutes and the broadcast interval is 1 minute, the CBC will broadcast the message 30 times, one every minutes, for a total of 30 minutes. A reason for using broadcast is because the TOM server knows the location of the event but not the location(s) of vehicles and/or other devices in the area of relevance. The broadcast interval is utilized so that any vehicle and/or other device that moves into the area of relevance during the broadcast duration is likely to receive the message.

The CBC then broadcasts the event notification message, including the description of the event, to all vehicles within the area of relevance in accordance with the broadcast duration and the broadcast interval. Any vehicles that are in the area of relevance will receive the event notification message broadcast and can then take any appropriate action. For example, a vehicle can ignore the event notification message if it is moving away from the area of relevance of the event or can reroute the travel route if the event location is en route.

The concepts and technologies disclosed herein provide several technical and commercial benefits over existing technologies. In particular, the concepts and technologies disclosed herein can reduce traffic congestion on roads, save travel time, reduce other events in the vicinity of the event, provide an effective means of notification for information that is relevant to drivers, other vehicle occupants, and vehicle systems, and to ensure a higher level of safety for vehicle occupants.

The concepts and technologies disclosed herein will be described in context of certain types of sensors, broadcast technologies, and devices capable of receiving broadcasts (e.g., vehicles). It should be understood, however, that the concepts and technologies disclosed herein can be agnostic to the type of sensors used to identify an event, the technology for broadcast, and the type of devices receiving the broadcasts.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of reservations-based intelligent roadway traffic management will be described.

Figure 1:
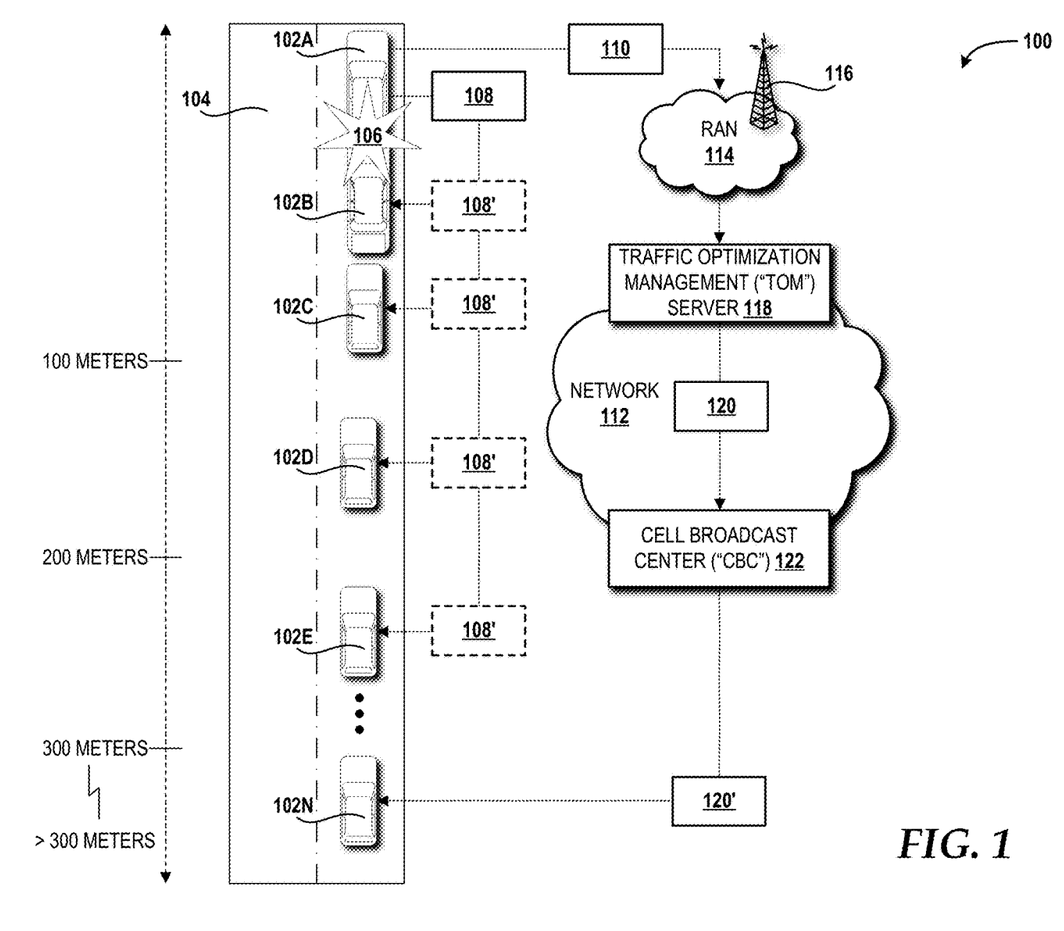
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes a plurality of vehicles 102A-102N, each of which is currently traveling on a road 104. A first vehicle 102A is associated with an event 106 with a second vehicle 102B. The illustrated event 106 is a vehicular accident in which the second vehicle 102B has collided with the first vehicle 102A. Although the illustrated event 106 is a vehicle-to-vehicle accident, the event 106 additionally or alternatively can be or can include a vehicle-to-pedestrian accident, a vehicle-to-structure accident, a vehicle-to-hazard accident, or any other type of vehicular accident involving one or more of the plurality of vehicles 102A-102N. The event 106 additionally or alternatively can be associated with a hard braking event, a rapid deceleration event, a cessation of movement event, an air bag deployment event, a traction control loss, one or more traffic conditions, one or more weather conditions, one or more road hazard conditions, one or more other conditions, or some combination thereof.

The events and event types disclosed herein are merely exemplary examples of some of the events and event types that can occur in real-world implementations. Due to the nearly endless number of situations that may result in the occurrence of one or more events, it is impractical for this disclosure to expressly describe each and every possible event. Thus, it should be understood that the concepts and technologies disclosed herein are intended to be applicable to the events expressly described and others to which the applicability of the concepts and technologies disclosed herein is understood to those skilled in the art.

The illustrated operating environment 100 also includes a third vehicle 102C positioned behind the second vehicle 102B, a fourth vehicle 102D positioned behind the third vehicle 102C, a fifth vehicle 102E positioned behind the fourth vehicle 102D, and so on to an Nth vehicle 102N. The vehicles 102A-102C are located within a first 100 meters of the event 106; the vehicle 102D is located between 100 meters and 200 meters; the vehicle 102E is located between 200 meters and 300 meters; and the vehicle 102N is located beyond 300 meters. The vehicles 102B-102E are all located within a short-range communications distance of the first vehicle 102A—that is, less than 300 meters in the illustrated example. The vehicle 102N is located beyond a short-range communications distance of the first vehicle 102A.

In response to the event 106, the first vehicle 102A can generate a short-range event message 108 that includes a description of the event 106. The concept of "short-range" is intended to encompass a range afforded by a short-range communications technology utilized by a designated short-range radio communications component (best shown in FIG. 2) of a vehicle 102. In the illustrated example, the range afforded by the short-range communications technology is less than 300 meters. The concepts of "long-range" is intended to encompass a range longer than the range afforded by a short-range communications technology, such as greater than 300 meters in the illustrated example.

The description of the event 106 can include, at least in part, output from one or more sensors of the first vehicle 102A (e.g., an airbag sensor indicating deployment of an airbag, a g-force sensor indicating a negative g-force indicative of heavy braking, and/or the like). Alternatively or additionally, the event 106 can include, at least in part, a predetermined description that is mapped to specific output of one or more sensors. For example, in response to a negative g-force that meets or exceeds a predefined threshold g-force value, the description of the event 106 can explain the occurrence of a heavy braking event, without explicitly stating sensor output. Those skilled in the art will appreciate the numerous ways in which the event 106 can be described, including both qualitative and a quantitative descriptions.

The first vehicle 102A can send a copy of the short-range event message 108' to the vehicles 102B-102E located within range for short-range communications. Additionally, the first vehicle 102A can generate a long-range event message 110 that also includes a description of the event 106. The first vehicle 102A can send the long-range event message 110 to a network 112 for delivery to other vehicles, such as the Nth vehicle 102N operating outside of the range afforded by the short-range communications component of the first vehicle 102A.

The description of the event 106 for the long-range event message 110 can include the same information as included in the short-range event message 108. It is contemplated, however, that more or less information may be included in the long-range event message 110 as is relevant to the distance between the source of the event 106 (e.g., the location of the accident involving the first vehicle 102A and the second vehicle 102B) and the destination of the long-range event message 110 (e.g., the location of the Nth vehicle 102N, which is not immediately impacted by the event 106; whereas the third vehicle 102C likely would be immediately impacted by the event 106).

Each of the plurality of vehicles 102A-102N can be a car, truck, van, motorcycle, moped, go-kart, golf cart, or any other ground-based vehicle configured to transport one or more passengers and/or cargo. Each of the plurality of vehicles 102A-102N can be driven by a person. Each of the plurality of vehicles 102A-102N, in some embodiments, is capable of operating in at least a partially autonomous control mode. Each of the plurality of vehicles 102A-102N, in some embodiments, is a fully autonomous vehicle. In some embodiments, each of the plurality of vehicles 102A-102N can operate as a level 3 or level 4 vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. The GOOGLE car, available from GOOGLE, is an example of a limited self-driving automation vehicle. The NHTSA defines a level 4 vehicle as a full self-driving automation vehicle that is designed to perform all safety-critical driving functions and monitor roadway conditions for an entire trip to a destination. Such a design anticipates that a user will provide destination or navigation input, but is not expected to be available for control at any time during the trip. This includes both occupied and unoccupied vehicles. The plurality of vehicles 102A-102N can include any combination of the aforementioned vehicle types and can have any combination of capabilities with regard to autonomy.

Each of the plurality of vehicles 102A-102N can be configured to connect to and communicate with one or more radio access networks ("RANs") 114 over an air/radio interface provided, at least in part, by one or more base stations 116. The RAN(s) 114 can include one or more cells, each of which is served by one or more of the base stations 116. As used herein, a "cell" refers to a geographical area that is served by one or more base stations operating within the RAN 114. As used herein, a "base station" refers to a radio receiver and/or transmitter (collectively, transceiver) that is/are configured to provide a radio/air interface by which devices can connect to the network 112. Accordingly, a base station is intended to encompass one or more base transceiver stations ("BTSs"), one or more NodeBs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves. The concepts and technologies disclosed herein will be described in context of the base stations 116 being eNodeBs operating in accordance with Long-Term Evolution ("LTE") standards. Those skilled in the art will appreciate the applicability of the concepts and technologies disclosed herein to other mobile telecommunications technologies and standards, some of which are expressly noted below.

The network 112 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, an evolved packet core ("EPC"), multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other 802.XX technologies (e.g., 802.11 WI-FI), and the like. The RAN 114 can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the vehicles 102. Data communications can be provided in part by the RAN 114 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN (such as in the example provided herein), any combination thereof, and/or the like.

The illustrated network 112 includes a traffic optimization management ("TOM") server 118 that provides enhanced security, safety, and information to cellular-equipped vehicles, such as the vehicles 102, and to road side equipment devices, such as traffic lights, toll booths, and others (not shown). The TOM server 118 can function as a message interceptor, message interrogator, traffic analysis system, and rules-based routing system for messages, such as long-range event messages 110, received from the vehicle(s) 102.

In some embodiments, the vehicle(s) 102 can send long-range event messages 110 to the TOM server 118 via user datagram protocol ("UDP"). It is contemplated, however, that the vehicles(s) 102 and the TOM server 118 can communicate using other protocols, such as TCP/IP, or a combination of protocols. In some embodiments, the long-range event messages 110 are formatted as JavaScript Object Notation ("JSON") messages, although those skilled in the art will appreciate the applicability of other formats. In some embodiments, security is provided, at least in part, using datagram transport layer security ("DTLS"), although those skilled in the art also will appreciate the applicability of other security protocols to prevent eavesdropping, tampering, unauthorized duplication of the long-range event messages 110, and/or other security vulnerabilities.

The TOM server 118 can receive long-range event messages 110 through an inbound message ingestion engine that fetches the message contents and places the contents into one or more inbound work queues. The inbound work queues can be based upon in-memory queues or some type of queue with persistence mechanisms, such as those provided by APACHE ACTIVEMQ (available from Apache Software Foundation) or an open source application server, such as GLASSFISH (available from Oracle Corporation) or JBOSS (available from Red Hat). It should be understood that the aforementioned technologies are merely exemplary examples and some of the technologies that can be utilized to implement inbound work queues for the TOM server 118, and as such, these technologies should not be construed as limiting in any way.

After a long-range event message 110 goes into a working queue, the long-range event message 110 can be processed through a message interrogation process to determine the message type and subtypes. For purposes of this disclosure, the TOM server 118 only receives one type of message—that is, the long-range event messages 110. It should be understood, however, that the TOM server 118 can receive other message types, each of which may have one or more subtypes. For example, the TOM server 118 can distribute messages to other devices, such as a mobile device in the hands of a pedestrian, and as such, the TOM server 118 can function as a message ingestion and distribution server, among other functionality. Also during the message interrogation process, the TOM server 118 can determine an event type, such as one of the event types described herein above, and, in some embodiments, additionally a message priority. For example, a traffic event type might have a normal priority whereas an accident event type might have an elevated priority. Other event types can be unrelated to vehicles, and instead, related to drones, mobile devices, pedestrians, and/or other aspects of a connected ("smart") city/town.

After determining the message type (i.e., long-range event message 110 in this example), the event type (e.g., accident event as in the illustrated example), and the event priority (if applicable), the TOM server 118 can analyze the message(s) and can create an event notification message 120 with a specification of an area of relevance, broadcast duration, broadcast interval, and a description of the event, and can send all of this information to a cell broadcast center ("CBC") 122. The CBC 122 can format the information as a cell broadcast message. Alternatively, the TOM server 118 can format the information for cell broadcast and can place the resulting cell broadcast message into an outbound queue for delivery to the CBC 122. If the message does not contain an event type or priority structure, the message can be sent to another outbound processing queue for additional processing and can log these messages into a log type data structure for future retrieval and reporting.

The concepts and technologies disclosed herein will be described in context of certain types of sensors, broadcast technologies, and devices capable of receiving broadcasts (e.g., vehicles). It should be understood, however, that the concepts and technologies disclosed herein can be agnostic to the type of sensors used to identify an event, the technology for broadcast, and the type of devices receiving the broadcasts.

The CBC 122 can receive the event notification message 120 from the TOM server 118, and can broadcast the event notification message 120' including the description of the event, to all vehicles within the area of relevance in accordance with the broadcast duration and the broadcast interval. Any vehicles that are in the area of relevance will receive the event notification message 120 broadcast and can then take any appropriate action. For example, a vehicle can ignore the event notification message 120 if it is moving away from the area of relevance of the event or can reroute the travel route if the event location is en route.

It should be understood that some implementations of the operating environment 100 include one or more vehicle occupants (not shown), one or more pedestrians (now shown), one or more road side equipment devices (not shown), one or more user devices (not shown), one or more roads 104, one or more events 106, one or more long-range event messages 110, one or more networks 112, one or more RANs 114, one or more base stations 116, one or more TOM servers 118, one or more event notification messages 120, one or more CBCs 122, or any combinations thereof. Thus, the illustrated embodiment should be understood as being illustrative, and should not be construed as being limiting in any way.

Figure 2:
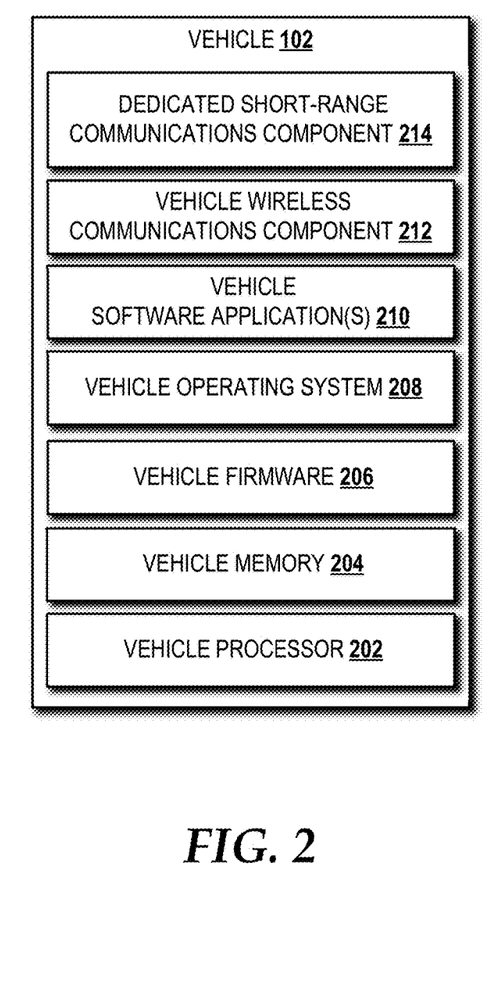
FIG. 2 is a block diagram illustrating aspects of a vehicle capable of implementing aspects of the embodiments disclosed herein.

Turning now to FIG. 2, a block diagram illustrating an example vehicle 102 and components thereof will be described, according to an illustrative embodiment of the concepts and technologies disclosed herein. The illustrated vehicle 102 includes a vehicle processor 202, a vehicle memory 204, a vehicle firmware 206, a vehicle operating system 208, one or more vehicle software applications 210, a vehicle wireless communications component 212, and a dedicated short-range communications ("DSRC") component 214. Each of these components will now be described in detail.

The vehicle processor 202 can include one or more hardware components that perform computations to process data, and/or to execute computer-executable instructions of one or more application programs such as the vehicle software application(s) 210, one or more operating systems such as the vehicle operating system 208, other software, and/or the vehicle firmware 206. The vehicle processor 202 can be part of a vehicle entertainment system, a vehicle navigation system, a vehicle ECU, and/or another computing system of the vehicle 102. The vehicle processor 202 can include one or more central processing units ("CPUs") configured with one or more processing cores. The vehicle processor 202 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the vehicle processor 202 can include one or more discrete GPUs. In some other embodiments, the vehicle processor 202 can include CPU and GPU components that are configured in accordance with a co-processing CPU/GPU computing model, wherein the sequential part of an application executes on the CPU and the computationally-intensive part is accelerated by the GPU. The vehicle processor 202 can include one or more system-on-chip ("SoC") components along with one or more other components illustrated as being part of the vehicle 102, including, for example, the vehicle memory 204, the vehicle wireless communications component 212, the dedicated short-range communications component 214, or some combination thereof. In some embodiments, the vehicle processor 202 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The vehicle processor 202 can be or can include one or more hardware components architected in accordance with an ARM architecture, available for license from ARM HOLDINGS of Cambridge, United Kingdom. Alternatively, the vehicle processor 202 can be or can include one or more hardware components architected in accordance with an x86 architecture, such an architecture available from INTEL CORPORATION of Mountain View, Calif., and others. Those skilled in the art will appreciate the implementation of the vehicle processor 202 can utilize various computation architectures, and as such, the vehicle processor 202 should not be construed as being limited to any particular computation architecture or combination of computation architectures, including those explicitly disclosed herein.

The vehicle memory 204 can include one or more hardware components that perform storage operations, including temporary or permanent storage operations. The vehicle memory 204 can be part of a vehicle entertainment system, a vehicle navigation system, a vehicle ECU, and/or another computing system of the vehicle 102. In some embodiments, the vehicle memory 204 includes volatile and/or non-volatile memory implemented in any method or technology for storage of information such as computer-readable instructions, data structures, program modules, the vehicle operating system 208, the vehicle firmware 206, the vehicle software application(s) 210, and/or other software, firmware, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the vehicle processor 202.

The vehicle firmware 206, also known as microcode, can be written onto a ROM of the vehicle memory 204. The vehicle firmware 206 can be part of a vehicle entertainment system, a vehicle navigation system, a vehicle ECU, and/or another computing system of the vehicle 102. The vehicle firmware 206 can be written on the ROM at the time of manufacturing and is used to execute programs on the vehicle processor 202. In some embodiments, the vehicle firmware 206 includes the vehicle operating system 208. In some embodiments, the vehicle firmware 206 is the vehicle operating system 208. In some embodiments, the vehicle firmware 206 and the vehicle operating system 208 are closely integrated for performance of operations of the vehicle 102.

The vehicle operating system 208 can control the operation of at least a portion of the vehicle 102. The vehicle operating system 208 can be part of a vehicle entertainment system, a vehicle navigation system, a vehicle ECU, and/or another computing system of the vehicle 102. In some embodiments, the vehicle operating system 208 includes the functionality of the vehicle firmware 206 and/or the vehicle software application(s) 210. The vehicle operating system 208 can be executed by the vehicle processor 202 to cause the vehicle 102 to perform various operations. The vehicle operating system 208 can include a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. Real-time operating system and embedded system also are contemplated. These operating systems are merely illustrative of some contemplated operating systems that may be used in accordance with various embodiments of the concepts and technologies described herein and therefore should not be construed as being limiting in any way.

The vehicle software application(s) 210 can execute on top of the vehicle operating system 208. The vehicle software application(s) 210 can be part of a vehicle entertainment system, a vehicle navigation system, a vehicle ECU, and/or another computing system of the vehicle 102. The vehicle software application(s) 210 can be executed by the vehicle processor 202 to cause the vehicle 102 to perform various operations described herein. For example, the vehicle software application(s) 210 can be part of a vehicle entertainment system, a vehicle navigation system, a vehicle ECU, and/or another computing system of the user vehicle.

The vehicle wireless communications component 212 can include one or more WWAN components capable of facilitating communication with one or more WWANs, such as the network 112 via the RAN 114. The vehicle wireless communications component 212 can be part of a vehicle entertainment system, a vehicle navigation system, a vehicle ECU, and/or another computing system of the vehicle 102. In some embodiments, the vehicle wireless communications component 212 is configured to provide multi-mode connectivity. For example, the vehicle wireless communications component 212 may be configured to provide connectivity to the RAN 114, wherein the RAN 114 functions in accordance with UMTS and LTE technologies, or via some other combination of technologies, and more particularly, one or more technologies that support cell broadcast functionality.

The DSRC component 214 can be a radio communications device that can send and receive short-range event messages 108. The DSRC component 214 can be part of a vehicle entertainment system, a vehicle navigation system, a vehicle ECU, and/or another computing system of the vehicle 102. In some embodiments, the DSRC component 214 is configured to operate within a 5.9 GHz radio frequency band as define by the United States Department of Transportation. In some embodiments, the DSRC component 214 is configured to operate within other radio frequency bands. In addition to or as an alternative to the DSRC 214, a vehicle 102 can utilize other technologies such as LTE V2X, and/or other vehicle communications technologies, including evolutions of existing technologies and entirely new technologies. Those skilled in the art will appreciate the applicability of the concepts and technologies disclosed herein for vehicle event notification via cell broadcast to many other vehicle communication technologies, and as such, the vehicle communication technologies expressly mentioned herein (e.g., DSCR) should not be construed as being limited in any way. Therefore, DSRC and other technologies that facilitate communication to/from a vehicle and another entity are collectively referred to herein as vehicle communications technologies. And as such, the DSRC component 214 can be broadly replaced by a vehicle communications technology component that utilizes, alone or in combination, DSRC, LTE V2X, and/or any other existing or future vehicle communications technology to implement aspects disclosed herein for V2V, V2X, V2I, I2V, V2P, P2V, and the like communications.

Figure 3:
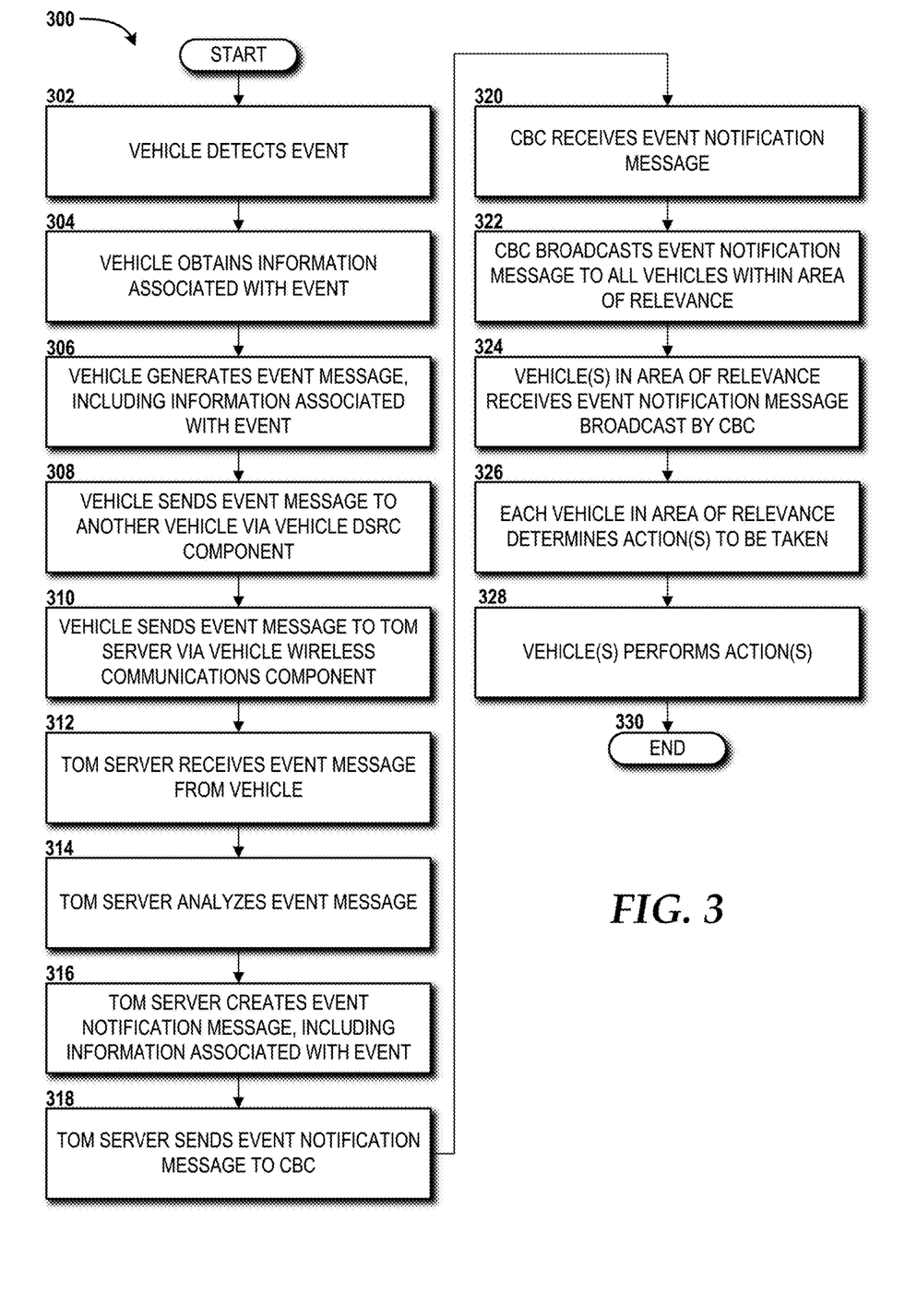
FIG. 3 is a flow diagram illustrating aspects of a method for event notification via cell broadcast, according to an illustrative embodiment of the concepts and technologies disclosed herein.

Turning now to FIG. 3, a flow diagram illustrating aspects of a method 300 for event notification via cell broadcast will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of one or more computing systems and/or devices disclosed herein to perform operations.

For purposes of illustrating and describing some of the concepts of the present disclosure, operations of the method 300 are described as being performed, at least in part, by the vehicle 102, the TOM server 118, and the CBC 122 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 1. The method 300 begins and proceeds to operation 302, where a vehicle 102 detects an event 106, such as the first vehicle 102A detecting the event 106 in the example illustrated in FIG. 1. From operation 302, the method 300 proceeds to operation 304, where the vehicle 102 obtains information associated with the event 106. From operation 304, the method 300 proceeds to operation 306, where the vehicle 102 generates an event message. For purposes of the method 300, the event message can include the short-range event message 108 and the long-range event message 110. From operation 306, the method 300 proceeds to operation 308, where the vehicle 102 sends the short-range event message 108 to one or more other vehicles (e.g., the vehicles 102B-102E) via the DSRC component 214. From operation 308, the method 300 proceeds to operation 310, where the vehicle sends the long-range event message 110 to the TOM server 118 via the vehicle wireless communication component 212.

From operation 310, the method 300 proceeds to operation 312, where the TOM server 118 receives the long-range event message 110 from the vehicle 102. From operation 312, the method 300 proceeds to operation 314, where the TOM server 118 analyzes the long-range event message 110. The TOM server 118 can extract information associated with the event 106 from the long-range event message 110. The TOM server 118 can determine an area of relevance for the event. In some embodiments, the TOM server 118 can determine the area of relevance based upon a set of information that includes event(s) type, proximity of event(s), timeframe in which the event(s) occurred, duration of the event(s), one or more weather conditions, one or more traffic conditions, other surrounding factors, or some combination thereof.

From operation 314, the method 300 proceeds to operation 316, where the TOM server 118 creates the event notification message 120. From operation 316, the method 300 proceeds to operation 318, where the TOM server 118 sends the event notification message 120 to the CBC 122. From operation 318, the method 300 proceeds to operation 320 where the CBC 122 receives the event notification message 120. From operation 320, the method 300 proceeds to operation 322, where the CBC 122 broadcasts the event notification message 120 to all vehicles within an area of relevance. More specifically, the CBC 122 can send the event notification message 120 to one or more of the base stations 116 operating within the RAN 114 and that serve the area of relevance.

From operation 322, the method 300 proceeds to operation 324, where the vehicle(s) 102 in the area of relevance receive the event notification message 120 broadcast by the CBC 122. Since the vehicle(s) 102 that receive the short-range event message 108 from a first vehicle are likely in the area of relevance, these vehicles will receive the same content in both the short-range event message 108 and the event notification message 120. In these instances, the vehicle(s) 102 can determine duplicative messages (e.g., via comparison of message content and/or message ID among messages received).

From operation 324, the method 300 proceeds to operation 326, where each of the vehicle(s) 102 in the area of relevance determines one or more actions to be taken. For example, the vehicle(s) 102 can change speed, the driver and/or other occupants can be reminded to be more alert, informing authorities, and/or if the vehicle(s) 102 have autonomous capabilities, the vehicle(s) 102 can switch to autonomous or partial autonomous mode to perform an autonomous action. From operation 326, the method 300 proceeds to operation 328, where the vehicle(s) 102 perform the action(s) determined at operation 326. From operation 328, the method 300 proceeds to operation 330, where the method 300 ends.

Figure 4:
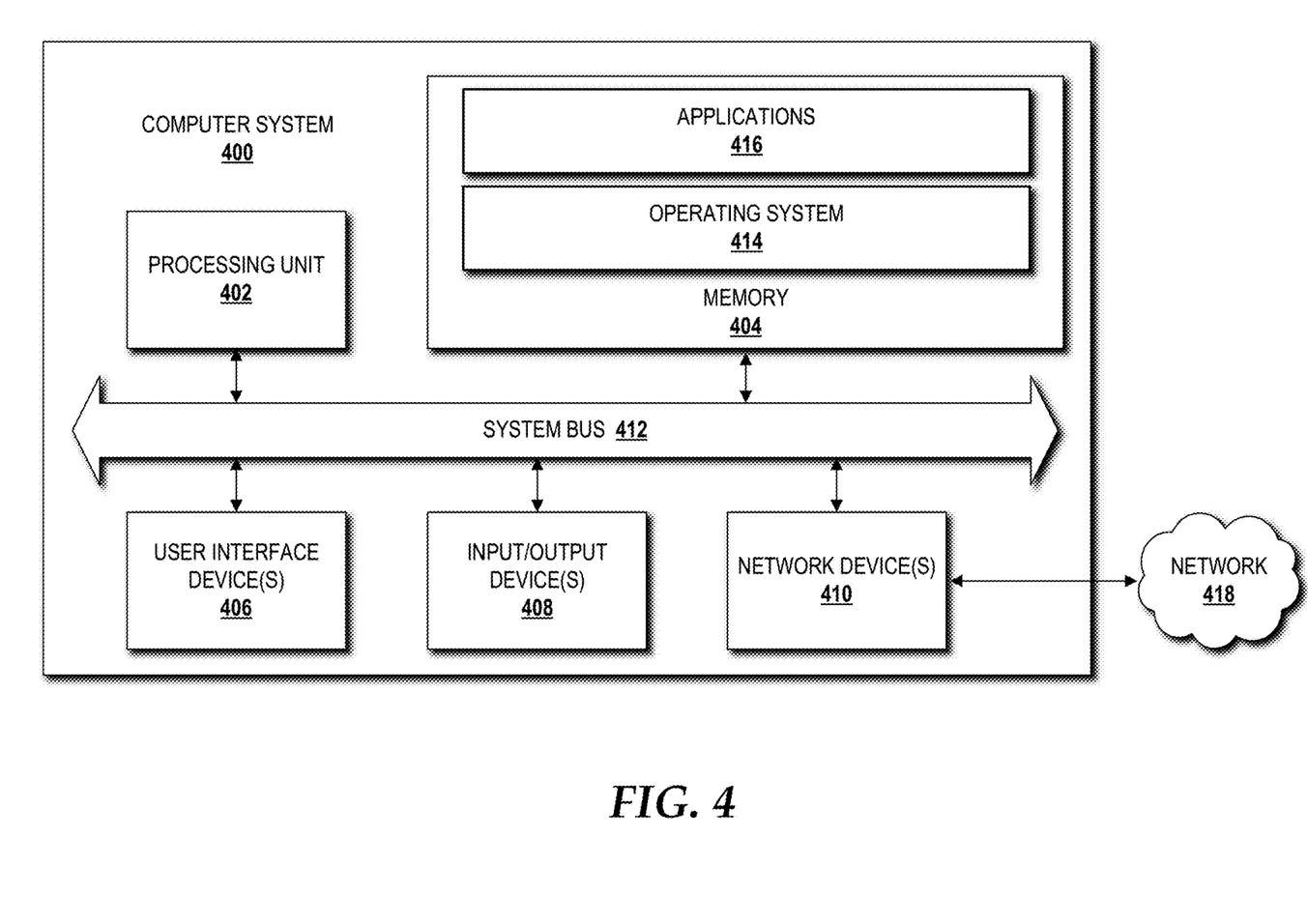
FIG. 4 is a block diagram illustrating an example computer system capable of implementing aspects of the embodiments presented herein.

FIG. 4 is a block diagram illustrating a computer system 400 configured to perform various operations disclosed herein. The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410. In some embodiments, one or more components of the vehicle(s) 102, one or more components of the RAN 114 (e.g., one or more of the base stations 116), one or more components of the network 112, the TOM server 118, the CBC 122, or some combination thereof is/are configured, at least in part, like the computer system 400. It should be understood, however, that one or more of these elements may include additional functionality or include less functionality than now described.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system and one or more applications 416.

The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer.

The network devices 410 enable the computer system 400 to communicate with other networks or remote systems via a network 418 (e.g., the RAN 114 and the network 112). Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
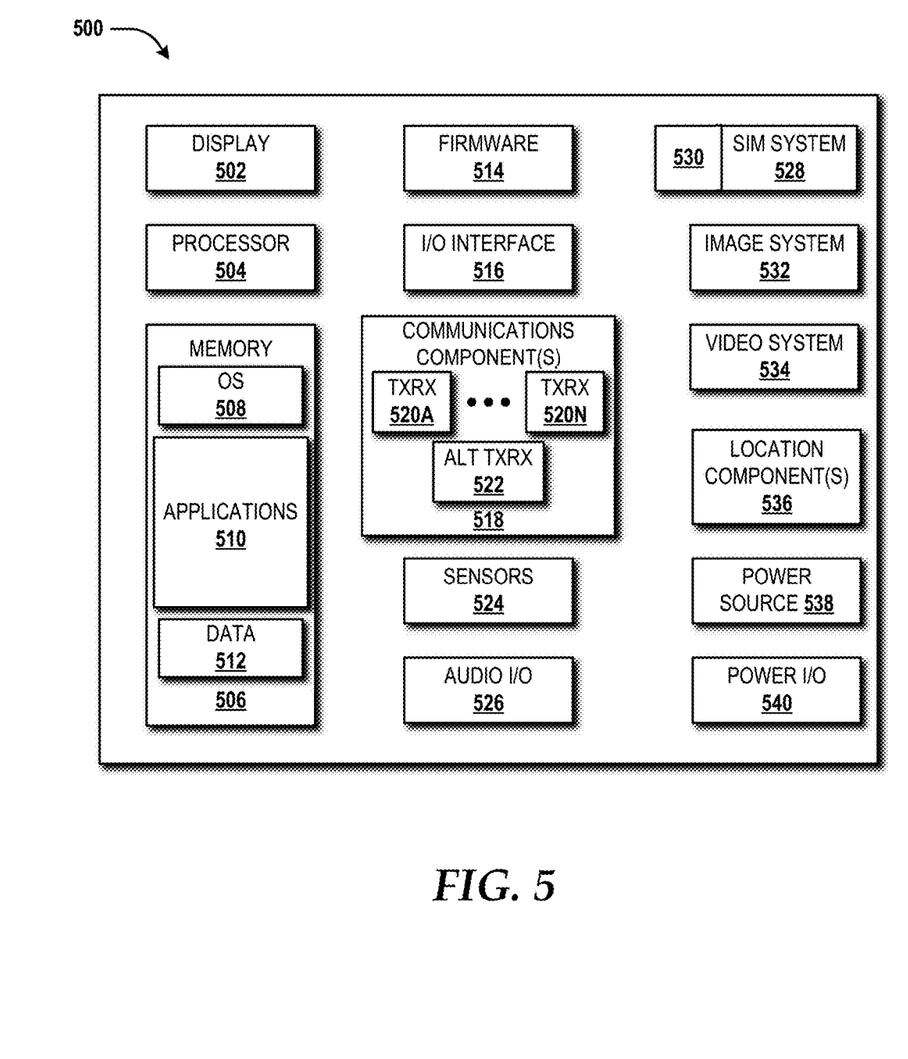
FIG. 5 is a block diagram illustrating an example mobile device capable of implementing aspects of the embodiments disclosed herein.

Turning now to FIG. 5, an illustrative mobile device 500 and components thereof will be described. In some embodiments, the mobile device 500 is configured to integrate with the vehicle 102 to provide various functionality described herein. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in data communications, entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described herein. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using GSM, CDMAONE, CDMA2000, LTE, and various other 2G, 2.5G, 3G, 4G, 5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
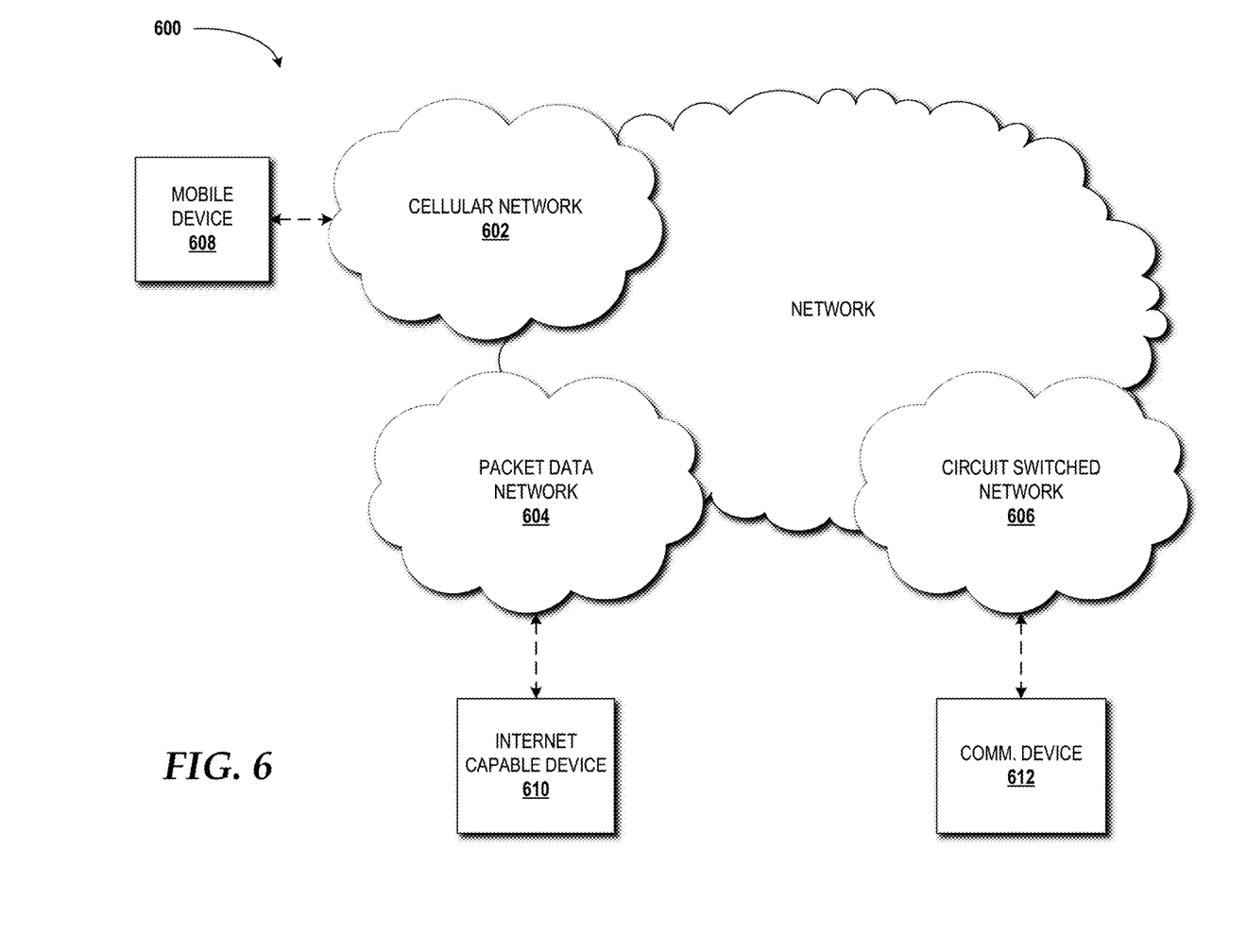
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606 (e.g., a public switched telephone network). The network 600 can include the network 112 and the RAN 114 illustrated and described with reference to FIG. 1.

The cellular network 602 includes various components such as, but not limited to, the RAN 114, the base stations 116, base transceiver stations ("BTSs"), NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 612, such as, for example, a cellular telephone, a user equipment, a mobile terminal, a PDA, a laptop computer, a handheld computer, the vehicle 102, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Based on the foregoing, it should be appreciated that concepts and technologies for vehicle event notification via cell broadcast have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising:

receiving, by a traffic optimization management server system comprising a processor, an event message in response to an event;

determining, by the traffic optimization management server system, based, at least in part, upon the event message, an area of relevance for the event, a location of the event, and a description of the event;

determining, by the traffic optimization management server system, a broadcast duration during which an event notification message should be broadcast and a broadcast interval with which the event notification message should be broadcast;

creating, by the traffic optimization management server system, the event notification message specifying the area of relevance, the location of the event, the description of the event, the broadcast duration, and the broadcast interval, wherein the event notification message is formatted as a cell broadcast message to be broadcast, by a cell broadcast center, to a cell serving at least a portion of the area of relevance; and providing, by the traffic optimization management server system, the event notification message to the cell broadcast center.

2. The method of claim 1, wherein receiving the event message in response to the event comprises receiving the event message from a first vehicle.

3. The method of claim 2, wherein the first vehicle also provides, via a designated short-range communications component, the event message to a second vehicle located within a distance from the first vehicle, and wherein the second vehicle provides the event message to the traffic optimization management server system.

4. The method of claim 3, wherein the area of relevance comprises a third vehicle located outside of a range of the designated short-range communications component; and
wherein the third vehicle is served by the cell.

5. The method of claim 1, wherein receiving the event message in response to the event comprises receiving the event message from a roadside device.

6. The method of claim 1, wherein the event comprises a vehicular accident in which a vehicle is involved, and wherein the description of the event comprises accident information.

7. The method of claim 1, wherein the event comprises:
a traffic event, and wherein the description of the event comprises a traffic condition;
a weather event, and wherein the description of the event comprises a weather condition; or
a road hazard event, and wherein the description of the event comprises a road hazard condition.

8. A computer-readable storage medium comprising computer-executable instructions that, when executed by a processor of a traffic optimization management server system, causes the processor to perform operations comprising:
receiving an event message in response to an event;
determining, based, at least in part, upon the event message, an area of relevance for the event, a location of the event, and a description of the event;
determining a broadcast duration during which an event notification message should broadcast and a broadcast interval with which the event notification message should be broadcast;
creating the event notification message specifying the area of relevance, the location of the event, the description of the event, the broadcast duration, and the broadcast interval, wherein the event notification message is formatted as a cell broadcast message to be broadcast, by a cell broadcast center, to a cell serving at least a portion of the area of relevance; and
providing the event notification message to the cell broadcast center.

9. The computer-readable storage medium of claim 8, wherein receiving the event message in response to the event comprises receiving the event message from a first vehicle.

10. The computer-readable storage medium of claim 9, wherein the first vehicle also provides, via a designated short-range communications component, the event message to a second vehicle located within a distance from the first vehicle.

11. The computer-readable storage medium of claim 10, wherein the area of relevance comprises a third vehicle located outside of a range of the designated short-range communications component; and wherein the third vehicle is served by the cell.

12. The computer-readable storage medium of claim 8, wherein receiving the event message in response to the event comprises receiving the event message from a roadside device.

13. The computer-readable storage medium of claim 8, wherein the event comprises a vehicular accident in which a vehicle is involved, and wherein the description of the event comprises accident information.

14. The computer-readable storage medium of claim 8, wherein the event comprises:
a traffic event, and wherein the description of the event comprises a traffic condition;
a weather event, and wherein the description of the event comprises a weather condition; or
a road hazard event, and wherein description of the event comprises a road hazard condition.

15. A traffic optimization management server system comprising:
a processor; and
memory that stores instructions that, when executed by the processor, cause the processor to perform operations comprising
receiving an event message in response to an event,
determining, based, at least in part, upon the event message, an area of relevance for the event, a location of the event, and a description of the event,
determining a broadcast duration during which an event notification message should be broadcast and a broadcast interval with which the event notification message should be broadcast,
creating the event notification message specifying the area of relevance, the location of the event, the description of the event, the broadcast duration, and the broadcast interval, wherein the event notification message is formatted as a cell broadcast message to be broadcast, by a cell broadcast center, to a cell serving at least a portion of the area of relevance, and
providing the event notification message to the cell broadcast center.

16. The traffic optimization management server system of claim 15, wherein receiving the event message in response to the event comprises receiving the event message from a first vehicle.

17. The traffic optimization management server system of claim 16, wherein the first vehicle also provides, via a designated short-range communications component, the event message to a second vehicle located within a distance from the first vehicle.

18. The traffic optimization management server system of claim 17, wherein the area of relevance comprises a third vehicle located outside of a range of the designated short-range communications component; and wherein the third vehicle is served by the cell.

19. The traffic optimization management server system of claim 15, wherein the event comprises a vehicular accident in which a vehicle is involved, and wherein the description of the event comprises accident information.

20. The traffic optimization management server system of claim 15, wherein the event comprises:
a traffic event, and wherein the description of the event comprises a traffic condition;
a weather event, and wherein the description of the event comprises a weather condition; or
a road hazard event, and wherein the description of the event comprises a road hazard condition.

* * * * *